United States Patent [19]
Huang et al.

[11] Patent Number: 5,380,098
[45] Date of Patent: Jan. 10, 1995

[54] SLIDING UNIT

[75] Inventors: Rong-Hong Huang; Kun-Lung Tsai; Hsi-Yen Chen; Chuck Chen; Tju-Yin Chang, all of Hsinchu, Taiwan, Prov. of China

[73] Assignee: Industrial Technology Research Institute, Hsinchu, Taiwan, Prov. of China

[21] Appl. No.: 147,840

[22] Filed: Nov. 4, 1993

[51] Int. Cl.⁶ .............................................. F16C 21/00
[52] U.S. Cl. ................................... 384/25; 384/37; 384/58
[58] Field of Search ................... 384/25, 37, 58, 613, 384/54, 624

[56] References Cited

U.S. PATENT DOCUMENTS

| | | | |
|---|---|---|---|
| 4,662,762 | 5/1987 | Schwarz | 384/25 |
| 4,997,292 | 3/1991 | Klimkovsky et al. | 384/613 |
| 5,273,367 | 12/1993 | Tanaka | 384/25 |
| 5,294,201 | 3/1994 | Agari | 384/25 |

*Primary Examiner*—Lenard A. Footland
*Attorney, Agent, or Firm*—W. Wayne Liauh

[57] ABSTRACT

A sliding unit includes a load-receiving device for permitting a load to be received thereon, a guiding device slidably mounting thereon the load-receiving device for permitting a direct relative sliding motion therebetween, and a load-sharing device mounted between the load-receiving device and the guiding device and capable of being in a rolling motion therebetween for resulting in a rolling contact effect therebetween. Such sliding unit can meet the demand of a high positioning precision/a high movement stability/a smaller friction coefficient/a better rigidity/a better vibration-resistivity.

22 Claims, 8 Drawing Sheets

SLIDING UNIT

BACKGROUND OF THE INVENTION

The present invention relates generally to a sliding unit, and more particularly to one having both a rolling friction and a sliding friction.

In the recent designing and manufacturing technique for the numerical control tool machines, it is required to be of high speed, high precision and high stability.

The feeding system (sliding unit) therefor conventionally includes the following two types:

a) One uses the sliding guideways which have a relatively larger sliding friction existing between the sliding guideways and the load-receiving device mounted on the sliding guideways (as shown in FIG. 1). Thus this type actually cannot meet our demands of high speed and high precision.

b) The other uses the rolling guideways. As shown in FIGS. 2 and 3, by applying the rolling balls 95 or the rolling cylinders 91, we can obtain the speed and the precision close to our demands. Whereas, when the rolling cylinders 91 are applied, there is a line contact existing between the load-receiving device and the guideways; and when the rolling balls 95 are applied, there is a point contact existing between the load-receiving device and the guideways. Therefore, the rigidity and the vibration-resistivity of the rolling guideways are not so satisfactory, and the surface roughness of the work piece is also poor.

To sum up, the conventional feeding system using the sliding guideways has the following disadvantages:

1) Because the friction coefficient occurred is relatively larger, the efficiency is adversely affected.
2) When a relatively heavy load is loaded on the load-receiving device and the sliding guideways, the used screw rod is apt to be deformed and thus the positioning precision and the reproducibility is deteriorated. Besides, the jamming and dragging situation is prone to occur.

On the other hand, the conventional feeding system using the rolling guideways has the following disadvantages:

1) The vibration-resistivity thereof is not so satisfactory.
2) The rigidity is not high enough so that the positioning effect is easily affected by the external force.

It is therefore attempted by the Applicant to deal with the above situation encountered by the prior art.

SUMMARY OF THE INVENTION

An object of the present invention is to provide a sliding unit having a relatively smaller friction coefficient.

Another object of the present invention is to provide a sliding unit having a relatively higher efficiency.

A further object of the present invention is to provide a sliding unit which can be loaded with a relatively heavier load.

A yet object of the present invention is to provide a sliding unit having a relatively better rigidity.

Still an object of the present invention is to provide a sliding unit having a relatively better vibration-resistivity.

One more object of the present invention is to provide a sliding unit having a relatively better positioning precision.

Still more object of the present invention is to provide a sliding unit having a relatively better stability.

Further more object of the present invention is to provide a sliding unit having a relatively higher speed.

Once more object of the present invention is to provide a sliding unit possessing a sliding friction and a rolling friction.

In accordance with one aspect of the present invention a sliding unit includes a load-receiving device for permitting a load to be received thereon, a guiding device slidably mounting thereon the load-receiving device for permitting a direct relative sliding motion therebetween, and a load-sharing device mounted between the load-receiving device and the guiding device and capable of being in a rolling motion therebetween for resulting in a rolling contact effect therebetween.

Certainly, the load-sharing device can include four roller units respectively mounted on four corners of a lower surface of the load-receiving device.

Certainly, the load-sharing device can include at least two roller units respectively rotating along axes thereof. The load-receiving device can have at least two sinks provided for correspondingly partly containing the at least two roller units.

Certainly, the at least two roller units can be two roller units respectively mounted on a front and a rear ends of a lower surface of the load-receiving device. Each of the at least two rolling units can include a roller seat, a roller mounted in the roller seat, a shaft mounting mounted in the roller seat, a roller shaft serving as an axis of the roller and mounted on the shaft mounting for permitting the roller to rotate along the roller shaft, a spring washer mounted in the roller seat, a spring mounted between the shaft mounting and the spring washer for permitting the load to be shared by the spring and the spring washer, a positioning device mounted in the roller seat and connected to the shaft mounting for preventing the roller unit from being slantedly located, and a retainer for suitably confining the shaft mounting and the roller in the roller seat. The spring can be replaceable so that we can adjust the load shared by the spring. The spring washer can be replaceable so that we can adjust the load shared by the spring washer. The roller can be cylindrical, tapered, drum-shaped or needle-shaped.

Certainly, the sliding unit can further include a lubricating oil passage mounted in the shaft mounting for inletting therethrough a lubricating oil.

Certainly, the guiding device can include a guideway mounted below the load-receiving device and corresponding to a middle of a lower surface of the load-receiving device. The guiding device can include two guideways mounted below the load-receiving device and corresponding to two side portions of a lower surface of the load-receiving device.

Certainly, the sliding unit can further include a sliding piece mounted below the load-receiving device for cooperating with the load-receiving device to envelop therein the guiding device. The sliding piece and the load-receiving device can be integrally formed. The sliding unit can further include at least one load-sharing device mounted on the sliding piece for permitting the sliding unit to glide more smoothly. The sliding unit can further include at least one lubricating passage provided on a lower surface of the load-receiving device for inletting therethrough a lubricating oil and permitting sliding surfaces on the guiding device, the sliding piece and the load-receiving device to be lubricated. Certainly, the guiding device can have a sliding friction with the sliding piece and the load-receiving device.

The present invention can be more fully understood by reference to the following description and accompanying drawings, which form an integral part of this application.

DETAILED DESCRIPTION OF THE PREFERRED EMBODIMENT

The present sliding unit includes a load-receiving device for permitting a load to be received thereon, a guiding device slidably mounting thereon the load-receiving device for permitting a direct relative sliding motion therebetween, and a load-sharing device mounted between the load-receiving device and the guiding device and capable of being in a rolling motion therebetween for resulting in a rolling contact effect therebetween.

Figure 1:
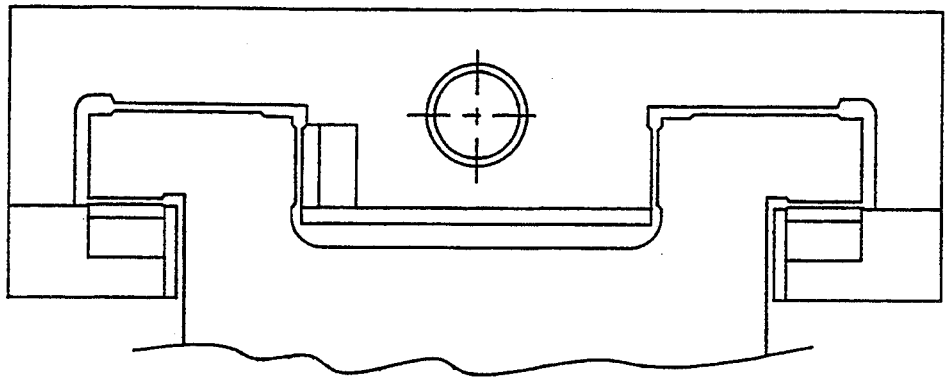
FIG. 1 shows a conventional sliding unit applying a sliding guideway.
Figure 2:
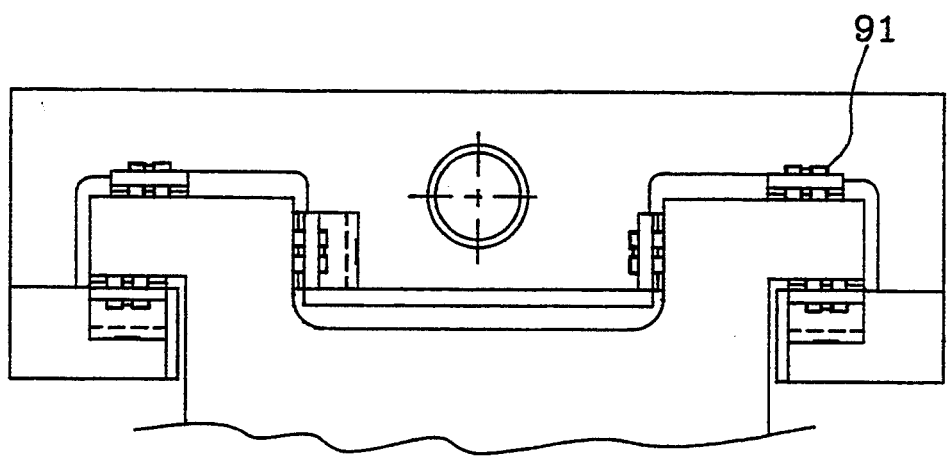
FIG. 2 shows a conventional sliding unit applying a rolling guideway.
Figure 3:
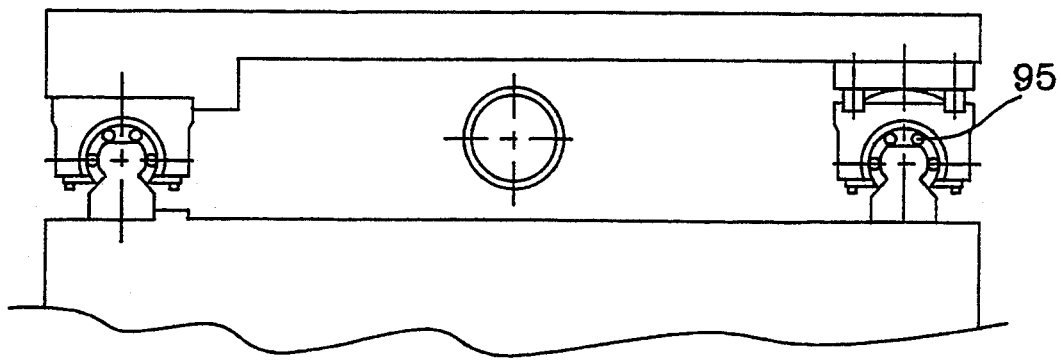
FIG. 3 shows a conventional sliding unit applying another rolling guideway.
Figure 4:
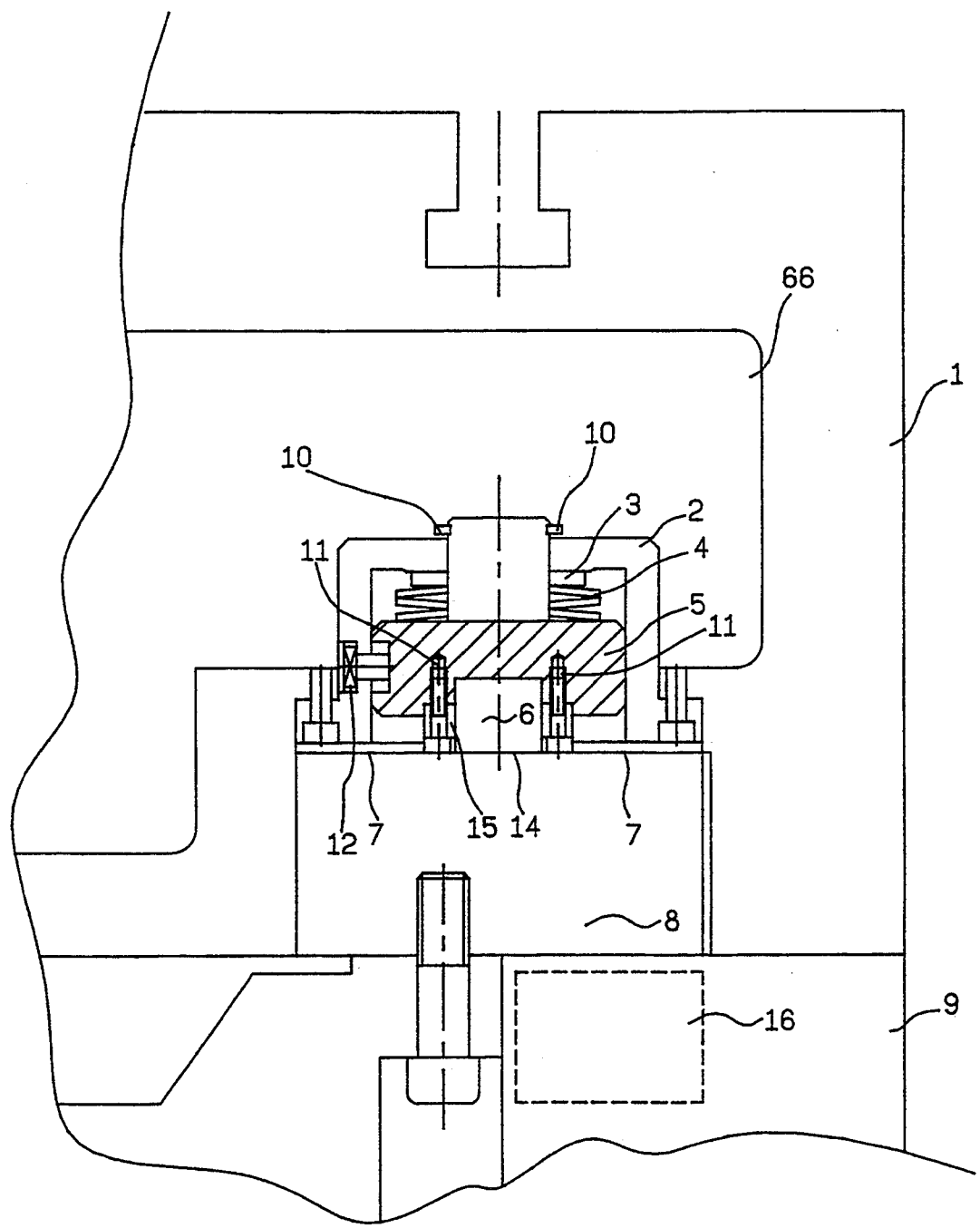
FIG. 4 is a sectional view of a preferred embodiment of a sliding unit according to the present invention.

One preferred embodiment of the present invention as shown in FIG. 4 includes a load-receiving device 1, a guiding device 8 being a guideway or two guideways, and a load-sharing device being at least two roller units correspondingly partly contained in at least two sinks 66. The at least two roller units can include four roller units respectively mounted on four corners of a lower surface of the load-receiving device 1 or two roller units respectively mounted on a front and a rear ends of a lower surface of the load-receiving device 1. Each of the at least two rolling units includes a roller seat 2, a roller 6 having a roller shaft 15 mounted in the roller seat 2, a shaft mounting 5 connecting thereto a roller shaft 15 by screws 11 and mounted in the roller seat 2 for permitting the roller 6 to rotate along the roller shaft 15, a spring washer 3 mounted in the roller seat 2, a spring 4 mounted between the shaft mounting 5 and the spring washer 3 for permitting the load to be shared by the spring 4 and the spring washer 3, a positioning device 12 mounted in the roller seat 2 and connected to the shaft mounting 5 for preventing the roller unit from being slantedly located, and a retainer 10 for suitably confining shaft mounting 5 and roller 6 in seat 2. Therefore, as shown in FIG. 4, there are both a sliding surface 7 and rolling surface 14 existing in the present sliding unit when the load is loaded on the load-receiving device 1, so the effect of the present sliding unit is much more satisfactory than that of the sliding unit possessing only sliding friction or rolling friction.

It is to be noticed that the spring washer 3 is replaceable so that we can adjust the load shared by the spring washer 3 and that the spring 4 is replaceable so that we can also adjust the load shared by the spring 4. Further, the roller 6 can be cylindrical (as shown in FIG. 4), tapered, drum-shaped or needle-shaped. Besides, a sliding piece 9 can be installed below the load receiving device 1 for cooperating with load-receiving device 1 to envelop therein the guiding device 8, and the sliding piece 9 and the load-receiving device 1 can be integrally formed. Certainly, there can be extra at least one roller unit 16 mounted on the sliding piece 9 for permitting the sliding unit to slide along guiding device 8 more smoothly.

Figure 5:
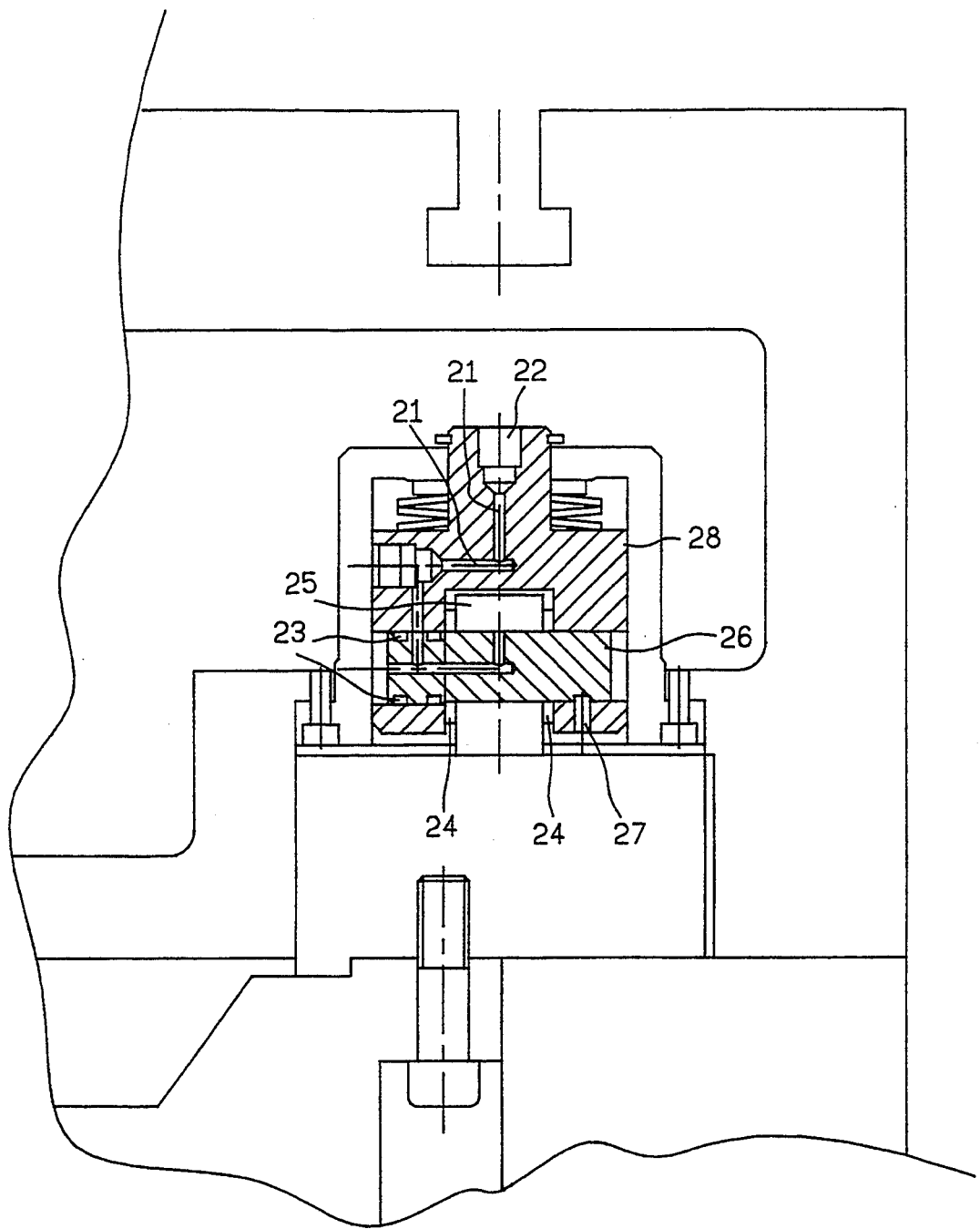
FIG. 5 is a sectional view of another preferred embodiment of a sliding unit according to the present invention.

Another preferred embodiment of the present invention is shown in FIG. 5, the chief components are generally the same as those of the preferred embodiment shown in FIG. 4. Whereas, there are also plural lubricating oil passages 21 and an oil inlet 22 mounted in the shaft mounting 28 for inletting therethrough a lubricating oil for preventing the aforementioned components from being frictionally worn. There are four O-rings 23 for preventing the lubricating oil from leaking, two spacing rings 24 for preventing roller 25 from being in an improper contact with the roller shaft 26. The screw 27 is used to fix shaft 26 with the shaft mounting 28.

Figure 6:
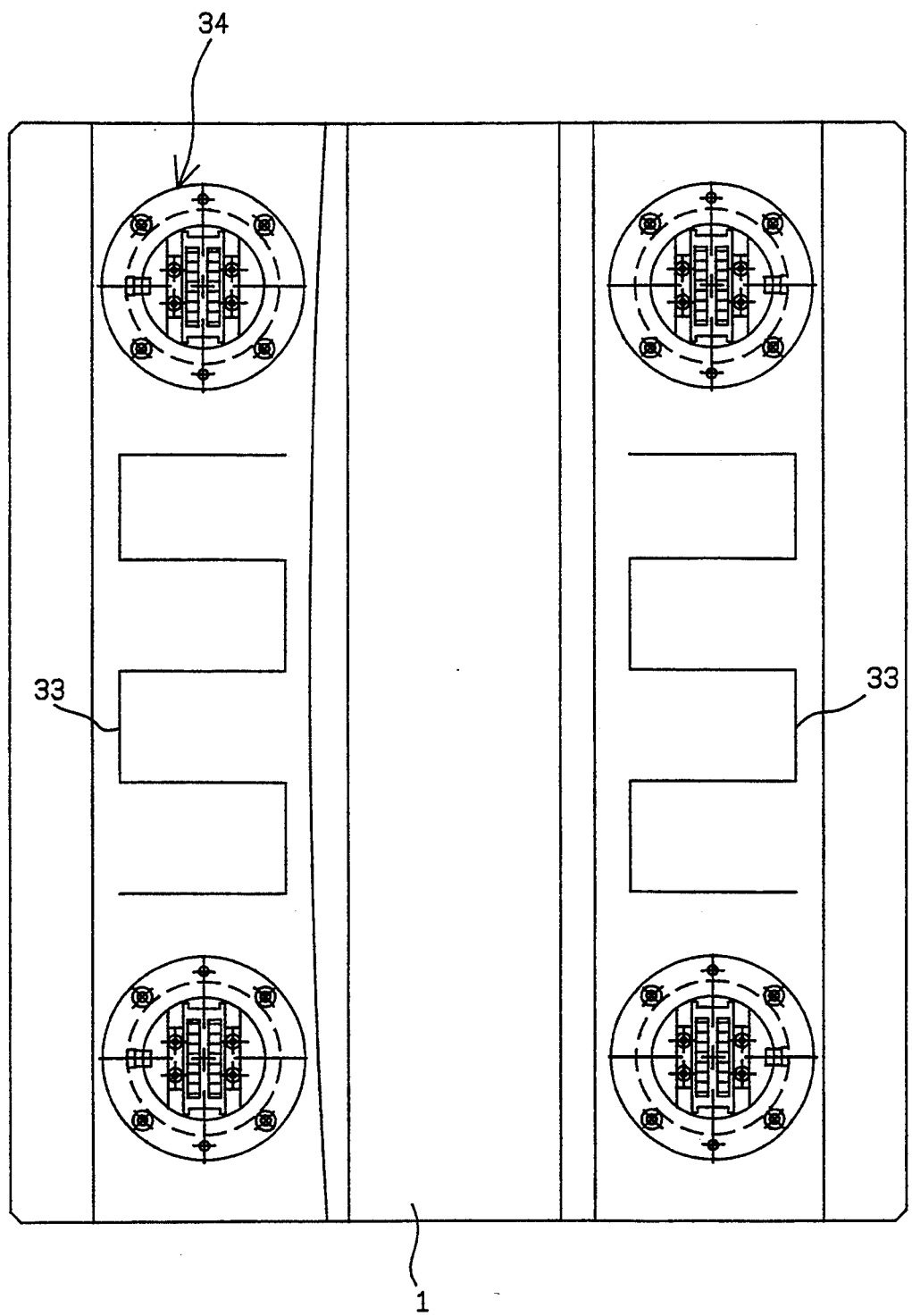
FIG. 6 is a bottom view of a load-receiving device with a load-sharing device according to the present invention.

Besides, as shown in FIG. 6, there are lubricating oil passages 33 provided on the lower surface of the load-receiving device 1 where the four roller units 34 are mounted.

Figure 7:
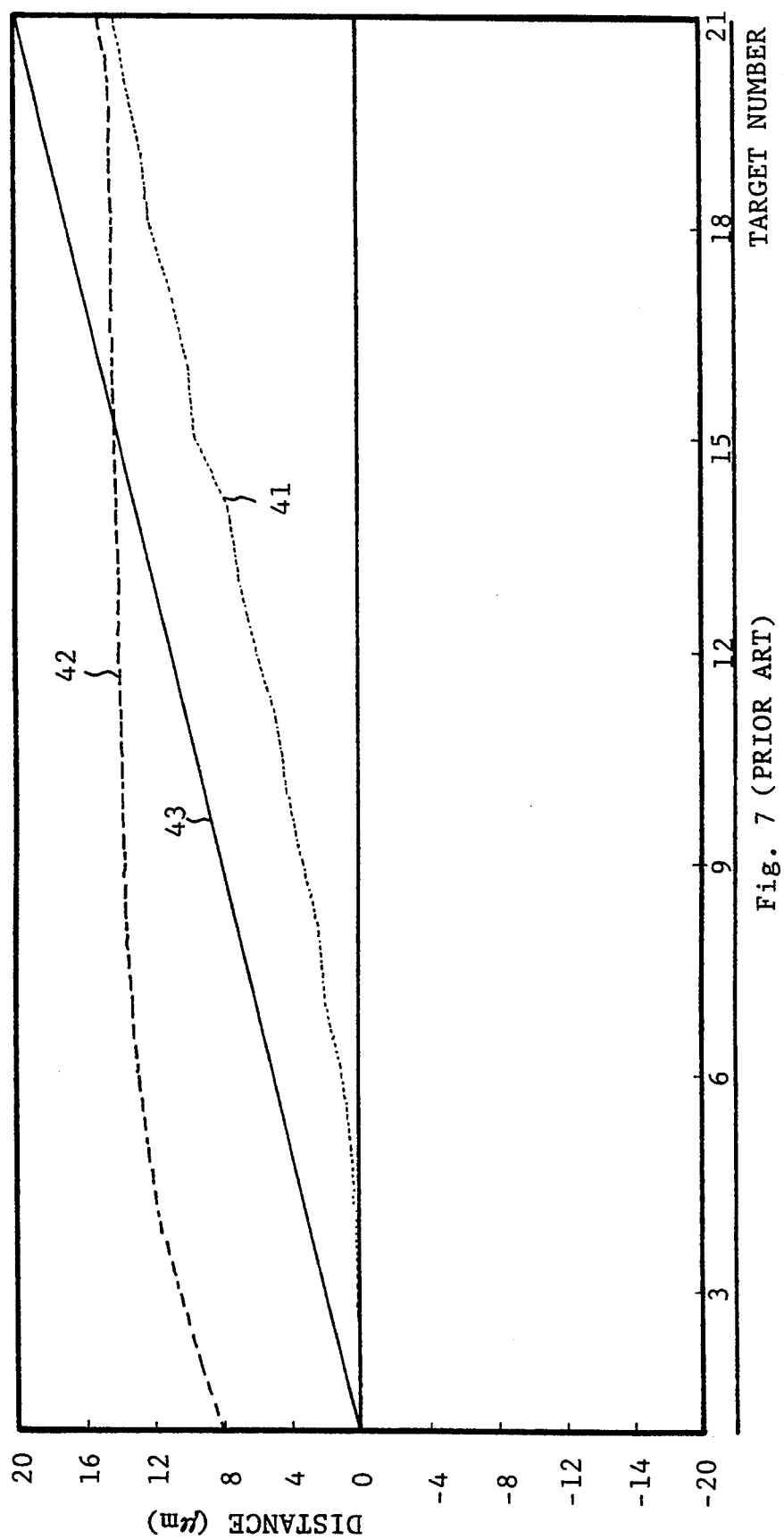
FIG. 7 shows the test results by smallest feeding units for the conventional sliding unit applying a sliding guideway.

The advantages of the present sliding unit such as the high positioning precision, the smaller friction, the high efficiency, and the high speed can be inspected by the following tests:

A) FIG. 7 shows the test results by smallest feeding units for the conventional sliding unit applying a sliding guideway. The horizontal axis represents the target number, and the longitudinal axis represents the actual moving distance of the load-receiving device, i.e., every graduation of the horizontal axis represents that the load-receiving device is ideally required to move forward 1 $\mu$m on the sliding guideway. Thus, when the target number is 1, the load-receiving device is ideally to be located at the position of 0 $\mu$m on the sliding guideway, (or on the longitudinal axis), and when the target number is 21, the load-receiving device is to be ideally moved to the position of 20 $\mu$m on the sliding guideway (or on the longitudinal axis. The solid line 43 shows the ideal relationship between the target number and the actual moving distance. While, the dotted curve 41 shows the actual forward movement of the load-receiving device on the sliding guideway, and when the target number is 21 the actual moving distance is 14 $\mu$m which is less than the ideal value 20 $\mu$m. The phantom curve 42 shows the actual backward movement of the load-receiving device on the sliding guideway, and when the target number is 1 the load-receiving device is still at the position of 8 μm which is more than the ideal value.

Figure 8:
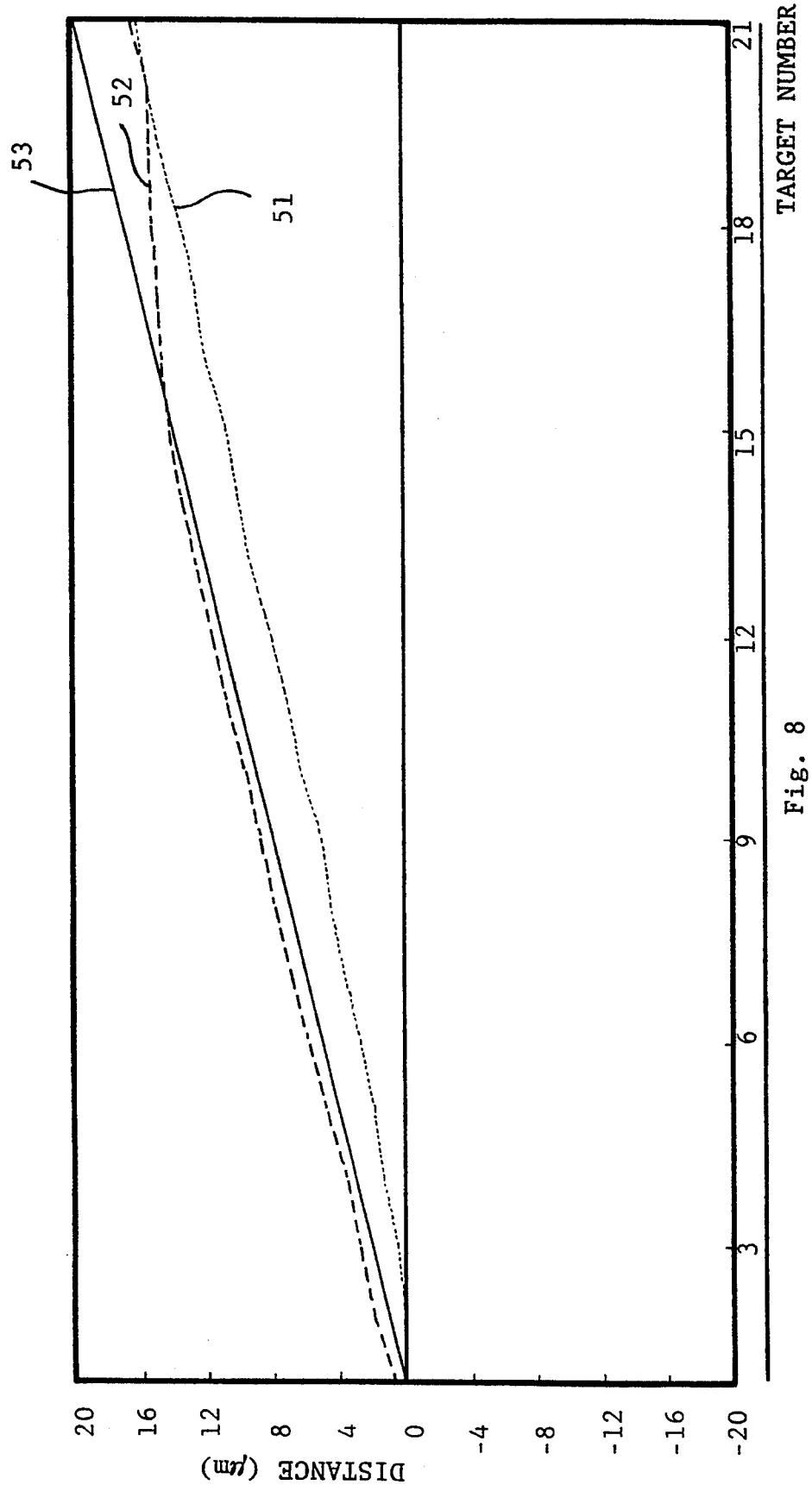
FIG. 8 shows test results by smallest feeding units for a sliding unit according to the present invention.

B) FIG. 8 shows that the test results by smallest feeding units for the present sliding unit. The test steps and the graduations of the horizontal and the longitudinal axes are the same as those in test A). The solid line 53 shows the ideal relationship between the target number and the actual moving distance. The dotted curve 51 shows the actual forward movement of the the present sliding unit, and when the target number is 21 the moving distance is 17 μm which is better than that measured in test A). The phantom curve 52 shows the actual backward movement of the present sliding unit, and when the target number is 1 the load-receiving device 1 is at the position of 1 μm which is better than that measured in test A). It is obviously from the testing results that the dotted curve 51 and the phantom curve 52 are much close to the ideal result shown by the solid line 53. Comparing FIG. 7 and FIG. 8, we can find that regardless of the forward movement or the backward movement, the present sliding unit has a relatively higher precision which is attributable to the fact that the friction coefficient occurred therein is relatively smaller.

Figure 9:
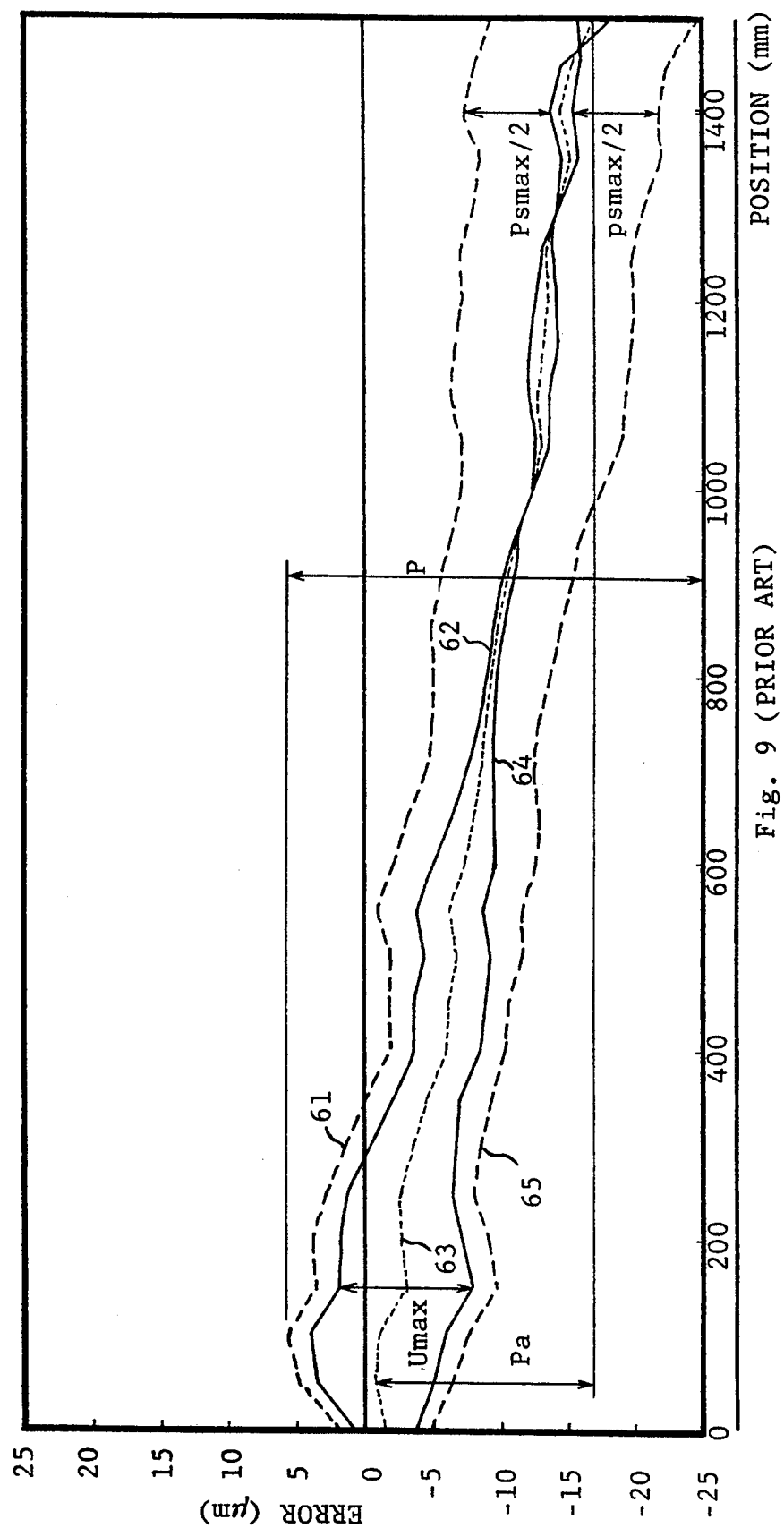
FIG. 9 shows test results for the positioning precision (P) of a conventional sliding unit applying a sliding guideway.

C) The third test is executed to find the positioning precision of the conventional sliding unit applying a sliding guideway, and the result is shown in FIG. 9. The horizontal axis represents the forward positioned position (in mm), and the longitudinal axis represents the occurred error (in μm). Five times of the tests are executed for every position. The positive average position error curve 62 is obtained and represented by:

$$\overline{Xj}\uparrow = \frac{1}{n}\sum_{i=1}^{n} Xij,$$

wherein n=5; and the negative average position error 64 can be obtained and represented by:

$$\overline{Xj}\downarrow = \frac{1}{n}\sum_{i=1}^{n} Xij,$$

wherein n=5.

The positive and negative average positioning curve 63 is obtained by taking a arithmetical average on the positive and negative position errors (i.e., $\frac{1}{2}(\overline{Xj}\uparrow +\overline{Xj}\downarrow )$). According to curve 62 and curve 64, we can obtain that the inverse error Umax (i.e., the largest error of Uj= $|\overline{Xj}\uparrow -\overline{Xj}\downarrow |$) is about 10 μm. Pa is obtained by subtracting the smallest value of curve 63 from the largest value of curve 63. Curve 61 is obtained by $\frac{1}{2}(\overline{Xj}\uparrow +\overline{Xj}\downarrow )+\frac{1}{2}(Psj+Uj)$, curve 65 is obtained by $\frac{1}{2}(\overline{Xj}\uparrow +\overline{Xj}\downarrow )-\frac{1}{2}(Psj+Uj)$, and the largest difference derived from curve 61 and curve 65 is P which is about 30 μm. According to curve 61 and curve 62, we can obtain that Psmax/2 is about 7 μm, and according to curve 64 and curve 65, we can obtain that Psmax/2 is also about 7 μm.

In fact, combining the equations of:

$$Sj\uparrow = \sqrt{\frac{1}{n-1}\sum_{i=1}^{n}(Xij\uparrow -\overline{Xj}\uparrow)},$$

wherein n=5; and $$Sj\downarrow = \sqrt{\frac{1}{n-1}\sum_{i=1}^{n}(Xij\downarrow -\overline{Xj}\downarrow)}$$

wherein n=5, we can get the desired equation $Psj=6\overline{Sj}=\frac{1}{2}(6Sj\uparrow +6Sj\downarrow )$, so the maximum value of Psj, Psmax can be obtained.

The value of Umax, Pa, P, and Psmax according to test C) are all listed in Table 1.

Figure 10:
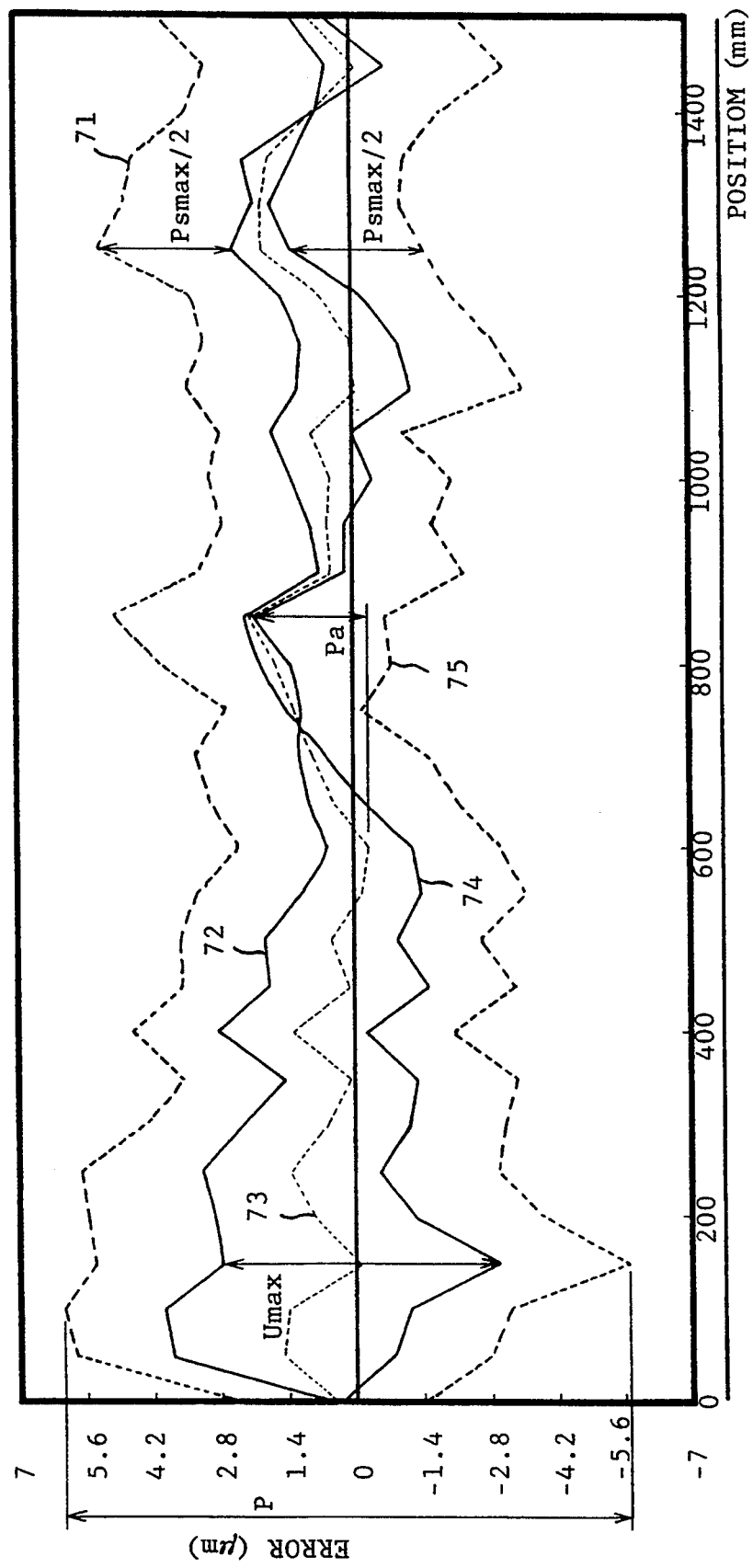
FIG. 10 shows test results for the positioning precision (P) of a sliding unit according to the present invention.

D) The fourth test is executed to find the positioning precision of the present sliding unit. The horizontal axis representation and the longitudinal axis representation in FIG. 10 are the same as those in FIG. 9. Further, the meanings and the calculation of the curves 71, 72, 73, 74, and 75 in FIG. 10 are the same as those of the curves 61, 62, 62, 64, and 65 in FIG. 9. The parameters can also be obtained in a manner the same as those in test C).

Referring to FIG. 10, the values of Umax, Pa, P, Psmax are also shown in Table 1. As shown in Table 1, the positioning precision of the present sliding unit is much better than that of the conventional sliding unit applying a sliding guideway.

Obviously, compared with the sliding unit applying a rolling guideway, the present sliding unit has both the rolling contact effect and the sliding contact effect, so the rigidity and the vibration-resistivity of the present sliding unit are better than those of the sliding unit applying a rolling guideway. To sum up, the present sliding unit actually has a better positioning precision, a better movement stability, and a smaller friction coefficient than those of the sliding unit applying a sliding guideway, and

TABLE 1

| TYPE OF SLIDING UNIT | ERROR (μm) PARAMETER ||||
|---|---|---|---|---|
| | $U_{max}$ | Pa | P | Psmax |
| SLIDING UNIT APPLYING THE SLIDING GUIDEWAYS | 10 | 15 | 30 | 14 |
| THE PRESENT SLIDING UNIT | 5.8 | 3 | 12 | 5.6 | has a better rigidity and a better vibration-resistivity better than those of the sliding unit applying a rolling guideway, so the present sliding unit can overcome the disadvantages of the sliding units applying only the sliding guideways or the rolling guideways.

While the present invention has been described in connection with what are presently considered to be the most practical and preferred embodiments, it is to be understood that the invention is not to be limited to the disclosed embodiments but on the contrary, is intended to cover various modifications and equivalent arrangements included within the spirit and scope of the appended claims whose scope is to be accorded the broadest interpretation so as to encompass all such modifications and equivalent structures.

What is claimed is:

1. A sliding unit comprising:
   a load-receiving device for permitting a load to be received thereon;

a guiding device slidably mounting thereon said load-receiving device for permitting a direct relative sliding motion therebetween; and a load-sharing device mounted between said load-receiving device and said guiding device and capable of being in a rolling motion therebetween for resulting in a rolling contact effect therebetween.

2. A sliding unit according to claim 1 wherein said load-sharing device can include four roller units respectively mounted on four corners of a lower surface of said load-receiving device.

3. A sliding unit according to claim 1 wherein said load-sharing device includes at least two roller units respectively rotating along axes thereof.

4. A sliding unit according to claim 3 wherein said load-receiving device has at least two sinks provided for correspondingly partly containing said at least two roller units.

5. A sliding unit according to claim 3 wherein said at least two roller units can be two roller units respectively mounted on a front and a rear ends of a lower surface of said load-receiving device.

6. A sliding unit according to claim 3 wherein each of said at least two rolling units includes:
a roller seat;
a roller mounted in said roller seat;
a shaft mounting mounted in said roller seat; and
a roller shaft serving as an axis of said roller and mounted on said shaft mounting for permitting said roller to rotate along said roller shaft.

7. A sliding unit according to claim 6 wherein said each roller unit further includes:
a spring washer mounted in said roller seat; and
a spring mounted between said shaft mounting and said spring washer for permitting said load to be shared by said spring and said spring washer.

8. A sliding unit according to claim 7 wherein said spring is replaceable so that we can adjust said load shared by said spring.

9. A sliding unit according to claim 7 wherein said spring washer is replaceable so that we can adjust said load shared by said spring washer.

10. A sliding unit according to claim 6 wherein said each roller unit further includes:

a positioning device mounted in said roller seat and connected to said shaft mounting for preventing said roller unit from being slantedly located; and a retainer for suitably confining said shaft mounting and said roller in said roller seat.

11. A sliding unit according to claim 6 wherein said roller is cylindrical.

12. A sliding unit according to claim 6 wherein said roller is tapered.

13. A sliding unit according to claim 6 wherein said roller is drum-shaped.

14. A sliding unit according to claim 6 wherein said roller is needle-shaped.

15. A sliding unit according to claim 6, further including a lubricating oil passage mounted in said shaft mounting for inletting therethrough a lubricating oil.

16. A sliding unit according to claim 1 wherein said guiding device includes a guideway mounted below said load-receiving device and corresponding to a middle of a lower surface of said load-receiving device.

17. A sliding unit according to claim 1 wherein said guiding device includes two guideways mounted below said load-receiving device and corresponding to two side portions of a lower surface of said load-receiving device.

18. A sliding unit according to claim 1, further including a sliding piece mounted below said load-receiving device for cooperating with said load-receiving device to envelop therein said guiding device.

19. A sliding unit according to claim 18 wherein said sliding piece and said load-receiving device are integrally formed.

20. A sliding unit according to claim 18, further including at least one load-sharing device mounted on said sliding piece for permitting said sliding unit to slide more smoothly.

21. A sliding unit according to claim 18, further including at least one lubricating passage provided on a lower surface of said load-receiving device for inletting therethrough a lubricating oil and permitting sliding surfaces on said guiding device, said sliding piece and said load-receiving device to be lubricated.

22. A sliding unit according to claim 18 wherein said guiding device has a sliding friction with said sliding piece and said load-receiving device.

* * * * *